United States Patent [19]

East

[11] 3,939,593
[45] Feb. 24, 1976

[54] FISH HOOK AND ASSEMBLY SNAPPER MASTER OR IMPROVED FISH HOOK AND ASSEMBLY (SNAPPER MASTER)

[76] Inventor: Hudson C. East, POB 1299, 1924 Western, Lake Charles, La. 70601

[22] Filed: Mar. 22, 1974

[21] Appl. No.: 453,815

[52] U.S. Cl. ................................. 43/41.2; 43/41
[51] Int. Cl.² ........................................ A01K 97/04
[58] Field of Search ........ 43/41.2, 41, 44.97, 44.96, 43/44.99, 44.91

[56] References Cited
UNITED STATES PATENTS

| | | | |
|---|---|---|---|
| 2,260,705 | 10/1941 | Eguchi | 43/41 |
| 2,768,464 | 10/1956 | Volz | 43/41.2 |
| 3,208,182 | 9/1965 | Holthaus | 43/41.2 |
| 3,643,368 | 2/1972 | Pool | 43/41.2 |

Primary Examiner—Louis G. Mancene
Assistant Examiner—Peter K. Skiff
Attorney, Agent, or Firm—George R. Douglas, Jr.; Anthony D. Cennamo

[57] ABSTRACT

An improved fish hook and assembly comprising a line for connection to a fishing reel and line, a leader element forming a line having a loop connecting the end of the line and a hook at its other end, and having a sink weight identity element connected at an intermediate point thereof, a weight leader having a loop end means at one end and being threaded onto the leader element between the sink weight identity element and its loop, a sleeve of essentially plastic material having a weight element at one end and a slot extending throughout the other end for receiving therein a hook when baited, together with a length of the weight leader and the leader element, and a distal end of the weight leader passing through an aperture at the bottom of the sleeve.

1 Claim, 2 Drawing Figures

FISH HOOK AND ASSEMBLY SNAPPER MASTER OR IMPROVED FISH HOOK AND ASSEMBLY (SNAPPER MASTER)

CROSS REFERENCE TO PRIOR ART

The present invention is an improvement over the following patents of interest:

| Cordry | 2,292,743 |
| Burrous | 2,475,736 |
| Eguchi | 2,260,705 |
| Colbert | 3,200,531 |

BACKGROUND OF THE INVENTION

The present invention is an improvement in fish hook and assembly elements of that allowed a baited hook to drop to the bottom of the body of water being fished, without the bait on the hook being made available to fish, minnows, and the like that are intermediate the water surface and the area to be finally used for fishing. More particularly, the invention relates to an apparatus to provide simple, convenient, economical and effective means whereby a fisher can lower his baited hook to the bottom of the water of the bay and then cause his baited hook to be released from a sleeve while at the bottom, or to release the hook from the sleeve at any desired depth by marking his line so that his baited hook escapes bait stealing fish while the baited hook is on the way down to the bottom of the water, and thus permits the entire bait on the hook to be presented to the fish being sought after.

FIELD OF THE INVENTION

The invention comprises a plastic pipe or sleeve having a slot or aperture therein for receiving a baited hook and the attending weight line and the line carrying the hook, a weight in the bottom of the sleeve, so that the baited hook is dropped through the upper portion of a water body, so that the baited hook is removed from the sleeve when it reaches the area sought to be fished.

DESCRIPTION OF THE PRIOR ART

The prior art references cited above do not show the details, manner, and results that are accomplished by the new and unobvious structural combination of elements of the present invention.

SUMMARY OF THE INVENTION

It is an object of the present invention to provide novel, improved and uniquely unobvious structures for aiding the catch of snappers by using protectively baited hooks so that fish such as trigger fish, spade fish, and the like are not able to get at the baited hook before it reaches the bottom where the most of the snappers feed.

It is a further and additional object of the present invention to provide a device which may be lowered in the body of water until the sleeve container enclosing the baited hook is felt to touch the bottom of the water body, and then a slight jerk is given on the line so that the baited hook is released from the sleeve container and ready for fishing. A further object of the invention is to provide apparatus so that one may fish at a certain depth; when a mark on the line indicating the depth desired to be fished is reached, and the container with a baited hook on a line is lowered to that mark, the line is given a slight jerk and the baited hook is released from the container for fishing at that depth without loss of the bait.

A further object of the present invention is to provide a sleeve and container for a baited hook and the leader elements for the hook and the sinker so that a rubber band may be attached and secured about the sleeve for securing the leaders onto the sleeve until the step of slightly jerking the line is made, as described above.

BRIEF DESCRIPTION OF THE DRAWINGS

The above and other objects and advantages of the invention will become apparent upon full consideration of the following detailed description and accompanying drawings in which.

DETAILED DESCRIPTION OF THE PREFERRED EMBODIMENT

Figure 1:
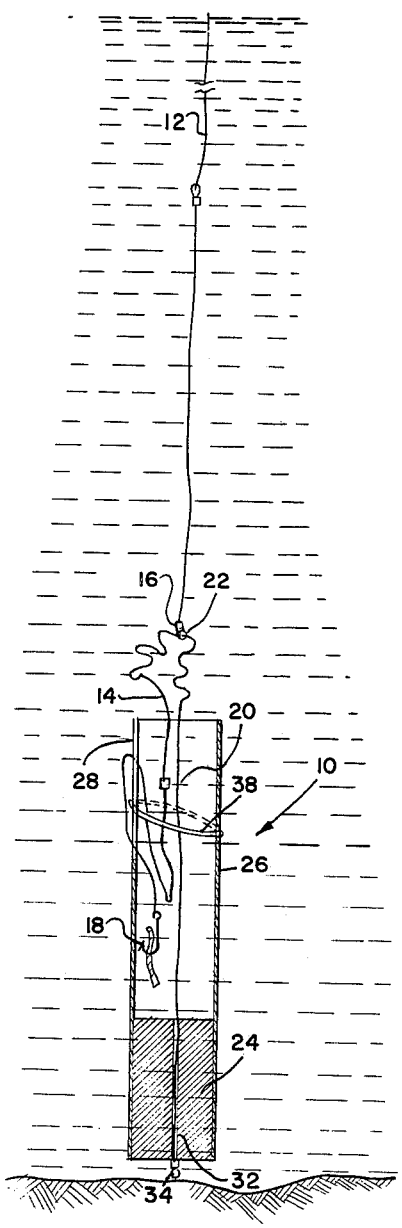
FIG. 1 is a broken away elevation view of the improved fish hook and assembly according to a preferred and best mode of the present invention in which the hook is disposed within a sleeve of plastic material while it is lowered into the water until it reaches the bottom.
Figure 2:
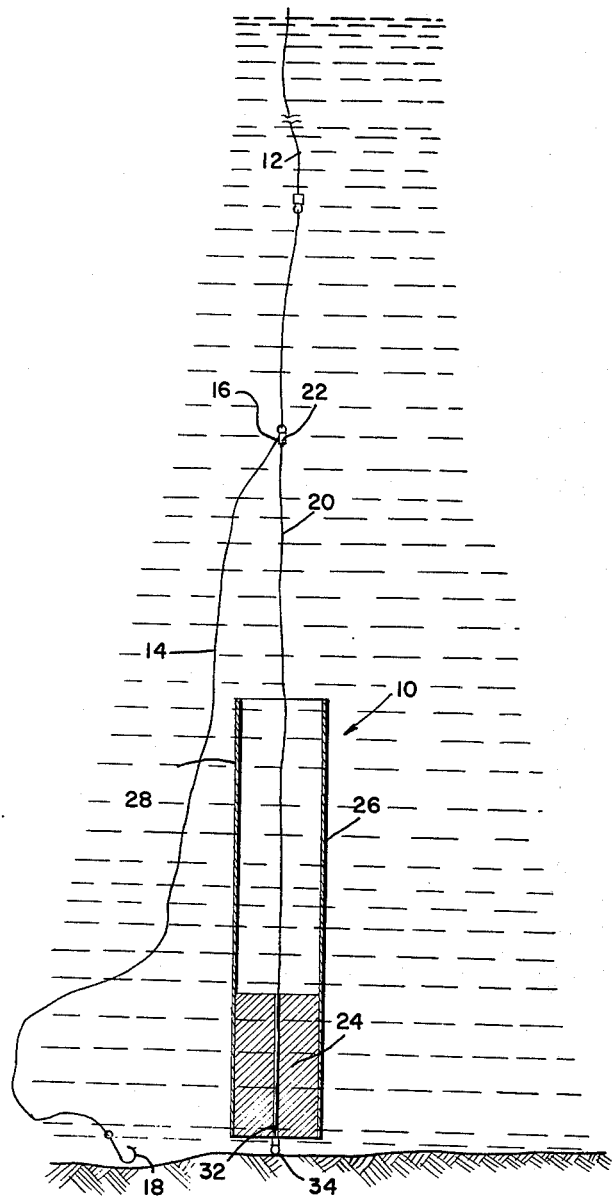
FIG. 2 is a similar scaled and broken away side view of the sleeve showing the hook removed from the sleeve.

Referring now to the drawings, there is shown an improved fish hook and assembly arrangement 10 in which there is a line 12 for connection to a fishing reel and line, a leader 14 forming a line having a loop 16 at one end for connection and being secured to the end of the line 12 and having a hook 18 at its other end. The hook 18 may be adapted for baits secured and hooked thereon in the usual manner. The line 12 has secured to it a weight leader 20 having a loop end means 22 disposed on the leader element between its loop and its sink weight identity element 24, the loop end means so constructed and sized to stop at the sink weight identity element. The sink weight identity element 24 is enclosed in a sleeve 26 of essentially plastic material so that the weight element is at one end thereon and throughout the other end of the sleeve is a slot 28 extending throughout and along the surface of the sleeve 26 and being constructed and arranged sufficiently large to receive the ingress and egress of the baited hook 18 together with a definite length of the weight leader 20.

There is an aperture 32 in the weighted end of the sleeve and in the distal end of the weight leader passing through the aperture and terminating in a cript sleeve 34. The weight leader 20 thus may pass readily through the weighted identity element 24.

It is noted that for best operation and functioning of the invention, that the sink weight element 24 should fill a substantial portion of the sleeve 26. The sleeve 26 may be of plastic or of a metal that is resistent to corrosion and deterioration when exposed to water.

It is within the purview of the present invention to provide that when the leader 14 and the weighted leader 20 are disposed within the sleeve, that these are retained within the sleeve while being lowered through the water by means of retention such as a rubber band wrapped around the sleeve such as rubber band means 38.

It is seen that by the means of the present invention the baited hook may be lowered until it is felt to touch the bottom of the water area and then a slight jerk is given so that the biated hook is released from the sleeve and it is ready for fishing at that given depth for where snappers feed. In this way trigger fish, spade fish, and other fish which are not sought to be caught will not be able to empty the hook of the bait and the baited hook will be able to reach the bottom where most of the snappers are found to feed. The rubber band may be either lost in the jerk applied to the line or it may be disposed so that it will be retained in loose fashion on the sleeve or on the leader.

Additional embodiments of the invention in this specification will occur to others and, therefore, it is intended that the scope of the invention be limited only by the appended claims and not by the embodiments described hereinabove. Accordingly, reference should be made to the following claims in determining the full scope of the invention.

I claim:
1. An improved fish hook and assembly comprising
  a line for connection to a fishing reel and line,
  a leader element forming a line having a loop for connection and being secured to the end of the line at one of its ends and having a hook at its other end and having a sink weight (leader) connected at an intermediate point of the leader element,
  a weight leader having a loop end means disposed on said leader element between its loop and its weight identity element, said loop end means so sized to stop at the weight identity element,
  a sleeve of essentially plastic metal material having a weight element at one end,
  a slot extending along the exterior surface of said sleeve and sufficiently large to receive the ingress and egress of said hook when baited and a length of said weight leader and said leader element,
  an aperture in the weighted end of said sleeve,
  and the distal end of said weight leader passing through said aperture and terminating in a crimped sleeve,
  said weight element filling a substantial portion of said sleeve,
  said weight leader and said leader element being retained within said sleeve by a rubber band.

* * * * *